US009879537B2

(12) United States Patent
Hill et al.

(10) Patent No.: US 9,879,537 B2
(45) Date of Patent: Jan. 30, 2018

(54) GAS TURBINE ENGINE AXIAL COMPRESSOR REAR HUB

(71) Applicant: United Technologies Corporation, Hartford, CT (US)

(72) Inventors: James Hill, Tolland, CT (US); Brian Merry, Andover, CT (US); Gabriel Suciu, Glastonbury, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 352 days.

(21) Appl. No.: 14/793,479

(22) Filed: Jul. 7, 2015

(65) Prior Publication Data

US 2016/0032726 A1 Feb. 4, 2016

Related U.S. Application Data

(60) Provisional application No. 62/031,614, filed on Jul. 31, 2014.

(51) Int. Cl.

| F01D 5/08 | (2006.01) |
|---|---|
| F01D 11/00 | (2006.01) |
| F02C 7/12 | (2006.01) |
| F04D 29/32 | (2006.01) |
| F02C 7/28 | (2006.01) |
| F04D 29/58 | (2006.01) |
| F04D 29/08 | (2006.01) |

(52) U.S. Cl.
CPC ............ *F01D 5/085* (2013.01); *F01D 5/084* (2013.01); *F01D 11/003* (2013.01); *F01D 11/005* (2013.01); *F02C 7/12* (2013.01); *F02C 7/28* (2013.01); *F04D 29/083* (2013.01); *F04D 29/321* (2013.01); *F04D 29/584* (2013.01); *Y02T 50/676* (2013.01)

(58) Field of Classification Search
CPC ........ F01D 5/084; F01D 5/085; F01D 11/003; F02C 7/12; F02C 7/28; F04D 29/321; F04D 29/584; F04D 29/083; Y02T 50/676

See application file for complete search history.

(56) References Cited

U.S. PATENT DOCUMENTS

| 2,858,103 A * | 10/1958 | Waugh ...................... F01D 5/06 416/193 A |
|---|---|---|
| 5,695,319 A * | 12/1997 | Matsumoto ............. F01D 5/085 415/114 |
| 6,405,538 B1 * | 6/2002 | Akiyama ................ F01D 5/081 415/115 |
| 6,491,495 B1 * | 12/2002 | Marushima ............. F01D 5/081 415/114 |
| 6,735,957 B2 * | 5/2004 | Marushima ............. F01D 25/12 60/784 |

* cited by examiner

*Primary Examiner* — Woody Lee, Jr.
*Assistant Examiner* — Adam W Brown
(74) *Attorney, Agent, or Firm* — Snell & Wilmer, L.L.P.

(57) ABSTRACT

A gas turbine engine includes an axial high pressure compressor includes a rear hub disposed aft of an aft rotor segment. The rear hub includes an inner surface, an outer surface, and a sealing face, wherein the sealing face is sealingly engaged with the aft rotor segment, and in fluid communication with the cooling channel. The cooling channels are configured to delivery air to contact the inner surface of the rear hub.

17 Claims, 3 Drawing Sheets

GAS TURBINE ENGINE AXIAL COMPRESSOR REAR HUB

CROSS-REFERENCE TO RELATED APPLICATIONS

This application is a nonprovisional of, and claims priority to, and the benefit of U.S. Provisional Application No. 62/031,614, entitled "GAS TURBINE ENGINE AXIAL COMPRESSOR REAR HUB," filed on Jul. 31, 2014, which is hereby incorporated by reference in its entirety.

FIELD

The present disclosure relates generally to axial compressor portions of gas turbine engines and more specifically, to sealing interfaces of axial compressor rear hubs.

BACKGROUND

Gas turbine engines generally include a compressor to pressurize inflowing air.

SUMMARY

A gas turbine engine compressor according to an embodiment comprises an aft rotor segment comprising an outer rim, an inner rim, and a cooling channel disposed between the inner rim and outer rim, and a rear hub disposed aft of the aft rotor segment and comprising an inner surface, an outer surface, and a sealing face, wherein the sealing face is sealingly engaged with the aft rotor segment, and wherein the inner surface of the rear hub is in fluid communication with the cooling channel. The sealing face of the rear hub is sealingly engaged with the outer rim of the aft rotor segment. One or more cooling channels are configured to delivery air to contact the inner surface of the rear hub. The rear hub may include a low pressure sink, and a cooling path may direct air to the low pressure sink. The outer radius of the sealing face may be equal to or less than a radius of the outer rim at the sealing interface, and sealing face may comprise a hub inlet port that aligns and is in fluid communication with each cooling channel. The sealing face engages with the inner rim of the aft rotor segment, and a portion of the outer rim extends aft of the sealing face of the rear hub.

A gas turbine engine according to an embodiment comprises an axial high pressure compressor comprising a rotary assembly, wherein the rotary assembly comprises an aft rotor segment comprising an outer rim, an inner rim, and a cooling channel disposed between the inner rim and outer rim, and a rear hub disposed aft of the aft rotor segment and comprising an inner surface, an outer surface, and a sealing face, wherein the sealing face is sealingly engaged with the aft rotor segment, and wherein the inner surface of the rear hub is in fluid communication with the cooling channel. The sealing face of the rear hub is sealingly engaged with the outer rim of the aft rotor segment. One or more cooling channels are configured to delivery air to contact the inner surface of the rear hub. The rear hub may include a low pressure sink, and a cooling path may direct air to the low pressure sink. The outer radius of the sealing face may be equal to or less than a radius of the outer rim at the sealing interface, and sealing face may comprise a hub inlet port that aligns and is in fluid communication with each cooling channel. The sealing face engages with the inner rim of the aft rotor segment, and a portion of the outer rim extends aft of the sealing face of the rear hub.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of embodiments herein makes reference to the accompanying drawings, which show embodiments by way of illustration. While these embodiments are described in sufficient detail to enable those skilled in the art to practice the inventions, it should be understood that other embodiments may be realized and that logical and mechanical changes may be made without departing from the spirit and scope of the inventions. Thus, the detailed description herein is presented for purposes of illustration only and not for limitation. For example, any reference to singular includes plural embodiments, and any reference to more than one component or step may include a singular embodiment or step. Also, any reference to attached, fixed, connected or the like may include permanent, removable, temporary, partial, full and/or any other possible attachment option.

As used herein, "aft" refers to the direction associated with the tail of an aircraft, or generally, to the direction of exhaust of the gas turbine. As used herein, "forward" and/or "fore" refers to the direction associated with the nose of an aircraft, or generally, to the direction of flight or motion.

Figure 1:
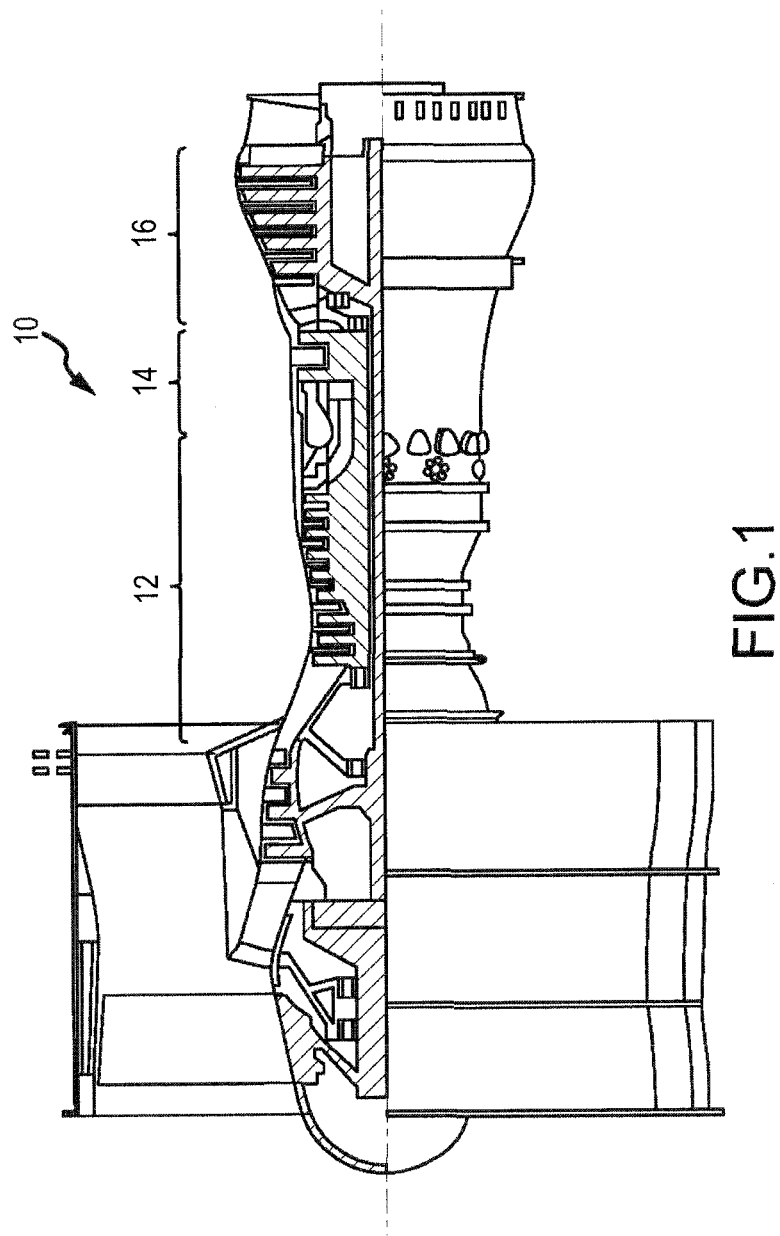
FIG. 1 illustrates, in accordance with various embodiments, a side view of a gas turbine engine.

With reference to FIG. 1, a gas turbine engine 10 is shown. In general terms, gas turbine engine may comprise a compressor section 12. Air may flow through compressor section 12 and into a combustion chamber 14, where the air is mixed with a fuel source and may be ignited to produce hot combustion gasses. These hot combustion gasses may drive a series of turbine blades within a turbine section 16, which in turn drive, for example, one or more compressor section blades mechanically coupled thereto.

Figure 2:
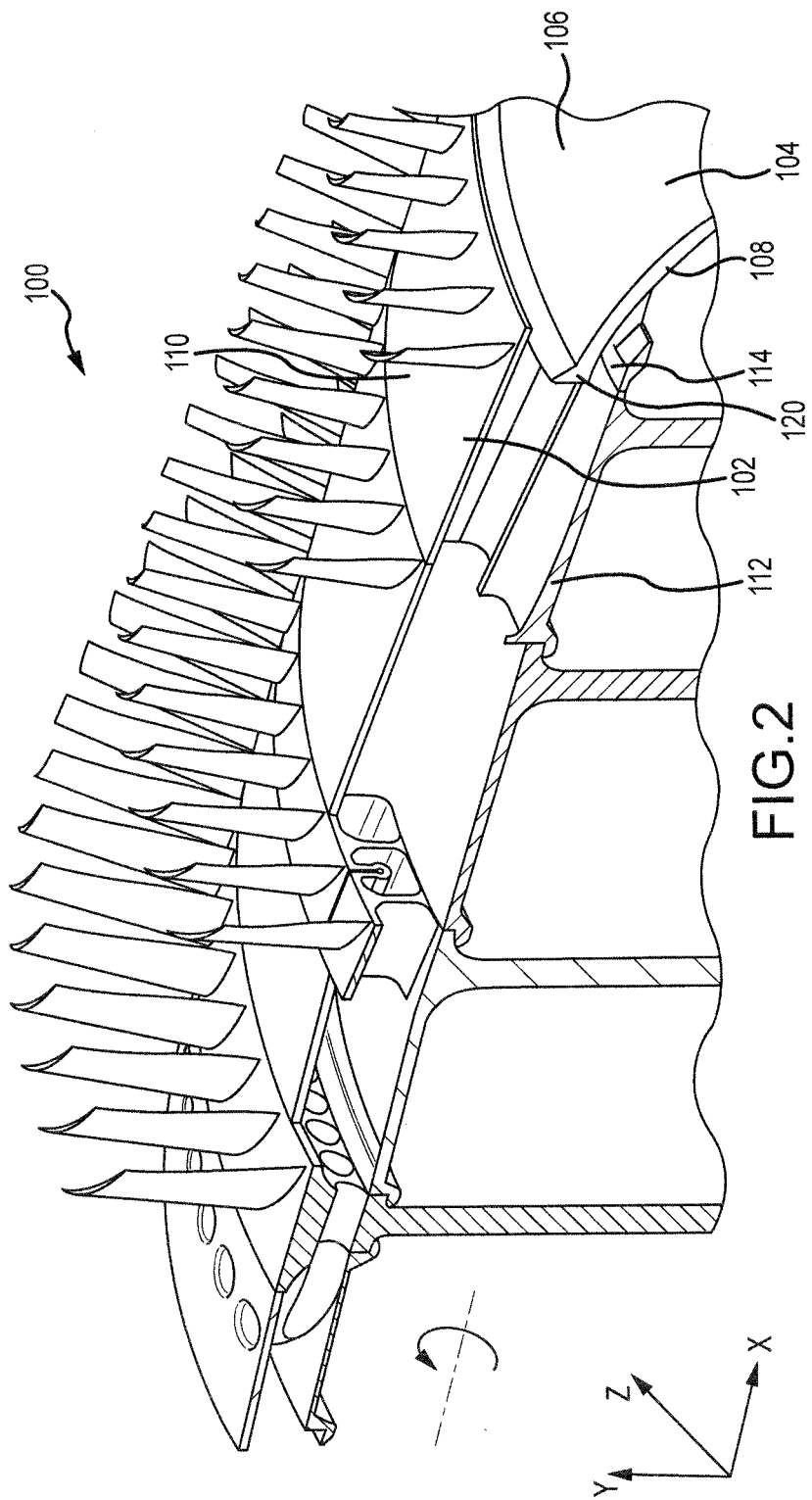
FIG. 2 illustrates, in accordance with various embodiments, a partial cross-sectional view of a compressor portion of a gas turbine engine.
Figure 3:
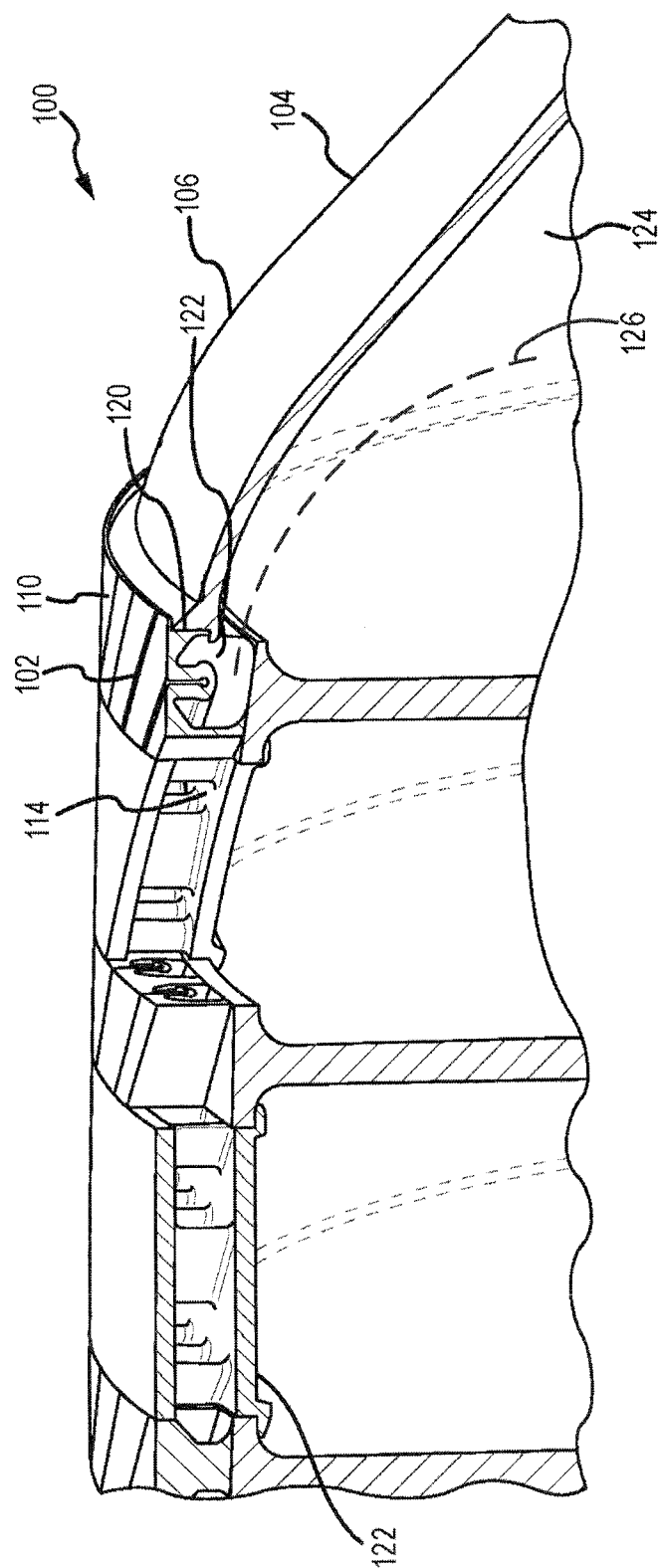
FIG. 3 illustrates, in accordance with various embodiments, a partial cross-sectional view of a compressor portion of a gas turbine engine.

With reference to FIGS. 2 and 3, compressor section 12 may comprise a high pressure section 100. High pressure section 100 may comprise, for example, an aft rotor segment 102. In various embodiments, aft rotor segment 102 may comprise the furthest aft rotor segment in the high pressure section 100. High pressure section 100 may comprise, for example, a plurality of blade segments and spacer segments located fore of aft rotor segment 102. In various embodiments, aft rotor segment 102 comprises a blade segment. In further embodiments, aft rotor segment 102 comprises a spacer segment.

In various embodiments, aft rotor segment 102 comprises an outer rim 110 an inner rim 112. Aft rotor segment 102 may further comprise one or more cooling channels 114. For example, cooling channels 114 may be disposed between outer rim 110 and inner rim 112 and provide cooler air to the rotor segments of high pressure section 100.

High pressure section 100 further comprises a rear hub 104. In various embodiments, rear hub 104 is disposed aft of aft rotor segment 102. Rear hub 104 may comprise an outer surface 106 and an inner surface 108. In various embodiments, rear hub 104 is adjacent and in contact with aft rotor segment 102. For example, rear hub 104 may be engaged with aft rotor segment 102 in a fluid-tight seal, such that air traversing outer rim 110 of aft rotor segment 102 is prevented from mixing with air traversing cooling channels 114.

In various embodiments, inner surface 108 is in fluid communication with cooling channels 114. For example, cooler air traversing cooling channels 114 may exit cooling channels 114, enter rear hub 104, and assist in cooling inner surface 108 of rear hub 104.

Rear hub 104 may further comprise, for example, a sealing face 120. For example, sealing face 120 may sealingly engage with aft rotor segment 102 to form a fluid-tight seal. In various embodiments, sealing face 120 comprises a flange, rim, or other feature. For example, sealing face 120 may comprise a flange having one or more hub inlet ports 122. In various embodiments, hub inlet ports 122 may be aligned with cooling channels 114 to allow air traversing cooling channels 114 to enter rear hub 104 at a desired pressure and angle. For example, sealing face 120 may comprise the same number of hub inlet ports 122 as cooling channels 114 of aft rotor segment 102. In such configurations, each cooling channel 114 may be aligned with an individual hub inlet port 122.

In various embodiments, sealing face 120 may comprise an outer radius that is equal to the outer radius of outer rim 110 of aft rotor segment 102. In further embodiments, the outer radius of sealing face 120 may be less than the radius of outer rim 110. In such embodiments, a portion of outer rim 110 may extend aft of inner rim 112 of aft rotor segment 102 and sealing face 120. Stated another way, a portion of outer rim 110 may extend past and cover a portion of outer surface 106 of rear hub 104.

Rear hub may further comprise, for example, a low pressure sink 124. In various embodiments, air traversing cooling channels 114 is directed along a cooling path 126 to channel the flow to low pressure sink 124 located within rear hub 104.

Benefits, other advantages, and solutions to problems have been described herein with regard to specific embodiments. Furthermore, the connecting lines shown in the various figures contained herein are intended to represent functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A gas turbine engine compressor comprising:
an aft rotor segment comprising an outer rim, an inner rim, and a cooling channel disposed between the inner rim and the outer rim; and
a rear hub disposed aft of the aft rotor segment and comprising an inner surface, an outer surface, and a sealing face, wherein the sealing face is sealingly engaged with the aft rotor segment, wherein the inner surface of the rear hub is in fluid communication with the cooling channel and wherein a portion of the outer rim extends aft of the sealing face of the rear hub.

2. The gas turbine engine compressor of claim 1, wherein the sealing face of the rear hub is sealingly engaged with the outer rim of the aft rotor segment.

3. The gas turbine engine compressor of claim 1, wherein the cooling channel is configured to delivery air to contact the inner surface of the rear hub.

4. The gas turbine engine compressor of claim 1, wherein the rear hub further comprises a low pressure sink and a cooling path, wherein the cooling path directs air from the cooling channel to the low pressure sink.

5. The gas turbine engine compressor of claim 1, wherein an outer radius of the sealing face is equal to or less than a radius of the outer rim.

6. The gas turbine engine compressor of claim 1, wherein the sealing face comprises a hub inlet port that aligns and is in fluid communication with the cooling channel.

7. The gas turbine engine compressor of claim 1, wherein the aft rotor segment comprises a plurality of cooling channels.

8. The gas turbine engine compressor of claim 7, wherein the sealing face comprises the same number of hub inlet ports as cooling channels, and each hub inlet port is in fluid communication with a corresponding cooling channel.

9. The gas turbine engine compressor of claim 1, wherein the sealing face engages with the inner rim.

10. A gas turbine engine comprising:
   an axial high pressure compressor comprising a rotary assembly, wherein the rotary assembly comprises an aft rotor segment comprising an outer rim, an inner rim, and a cooling channel disposed between the inner rim and the outer rim, and
   a rear hub disposed aft of the aft rotor segment and comprising an inner surface, an outer surface, and a sealing face, wherein the sealing face is sealingly engaged with the aft rotor segment, wherein the inner surface of the rear hub is in fluid communication with the cooling channel wherein the aft rotor segment comprises a plurality of cooling channels and wherein the sealing face comprises the same number of hub inlet ports as cooling channels and each hub inlet port is in fluid communication with a corresponding cooling channel.

11. The gas turbine engine of claim 10, wherein the sealing face of the rear hub is sealingly engaged with the outer rim of the aft rotor segment.

12. The gas turbine engine of claim 10, wherein the cooling channel is configured to delivery air to contact the inner surface of the rear hub.

13. The gas turbine engine of claim 10, wherein the rear hub further comprises a low pressure sink and a cooling path, wherein the cooling path directs air from the cooling channel to the low pressure sink.

14. The gas turbine engine of claim 10, wherein an outer radius of the sealing face is equal to or less than a radius of the outer rim.

15. The gas turbine engine of claim 10, wherein the sealing face comprises a hub inlet port that aligns and is in fluid communication with the cooling channel.

16. The gas turbine engine of claim 10, wherein the sealing face engages with the inner rim.

17. The gas turbine engine of claim 10, wherein a portion of the outer rim extends aft of the sealing face of the rear hub.

* * * * *